June 2, 1970　　F. V. KRUSE ET AL　　3,515,350
WATER IRRIGATION SYSTEM
Filed March 11, 1968　　3 Sheets-Sheet 1
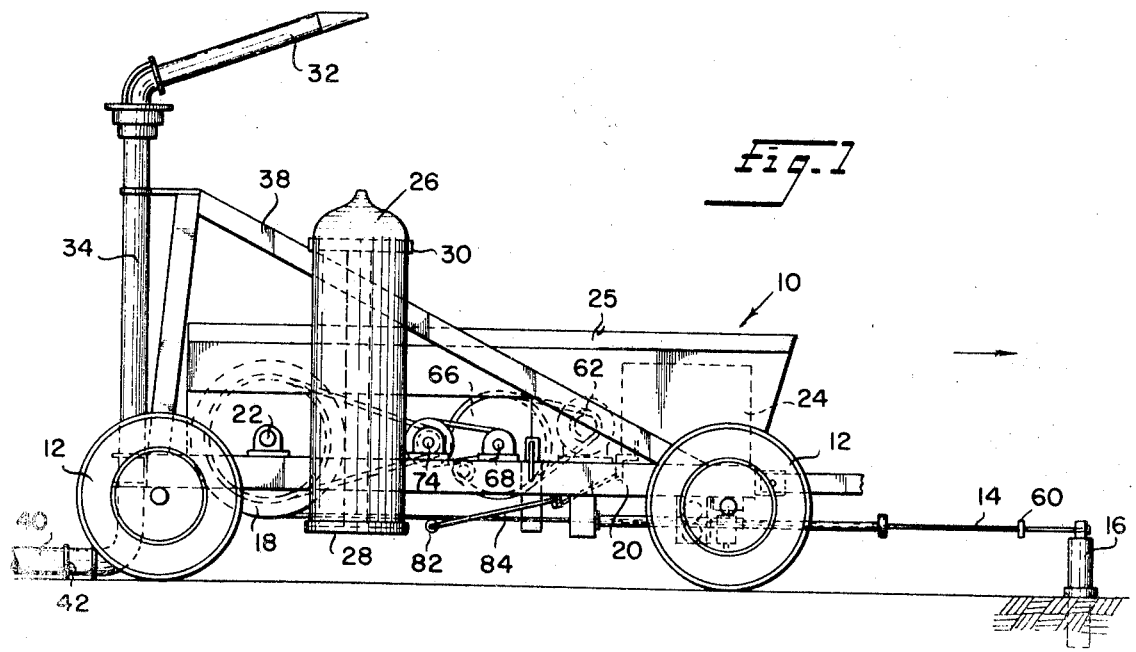
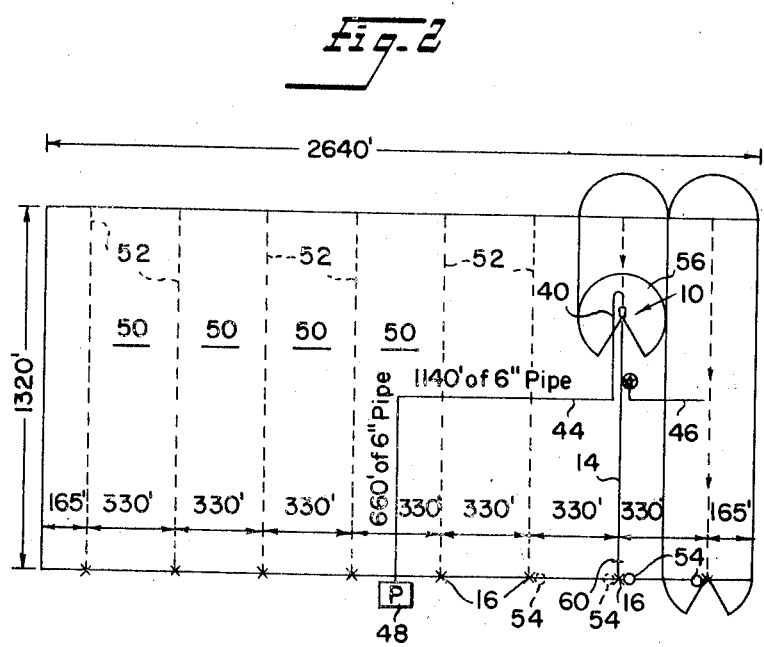
○ = Position Of Capstans For Previous Move
× = Location Of Earth Anchors
⊗ = Section Of Pipe Removed To Allow Vehicle To Pass And Attach Hose
INVENTORS
Frederick V. Kruse
Deane O. Behrends
BY　*Low & Matthews*
ATTORNEYS INVENTORS
Frederick V. Kruse
Deane O. Behrends BY Low & Matthews

ATTORNEYS

United States Patent Office 3,515,350
Patented June 2, 1970

3,515,350
WATER IRRIGATION SYSTEM
Frederick V. Kruse, Kilbourne, and Deane O. Behrends, Havana, Ill., assignors to AG-Rain Incorporated, Havana, Ill., a corporation of Delaware
Filed Mar. 11, 1968, Ser. No. 712,241
Int. Cl. B05b 3/00
U.S. Cl. 239—189                                  16 Claims

ABSTRACT OF THE DISCLOSURE

A mobile sprinkler unit carries its own motor drive and take-up winch for a cable on which the unit tracks. A sensor device detects the build-up in cable on the core of the winch and institutes automatic compensation therefor in order to secure substantially constant linear velocity. Automatic clutch engagement means starts the sprinkler when water from a pumping station reaches the unit. Automatic shut-off for the motor drive is provided when the sprinkler unit approaches the end of its run.

---

This invention relates to a water irrigation system of the type in which a mobile sprinkler unit tracks on a cable to yield a predetermined watering pattern. More particularly, this invention relates to a water irrigation system in which a mobile sprinkler vehicle carries its own propulsion means and a take-up winch for a cable securely anchored at one end of a field to be irrigated.

Heretofore, a number of major difficulties have prevented effective irrigation of large land areas by self-propelled vehicles. Among these difficulties have been the inability to provide a sufficiently high capacity of water per unit time, the problems inherent in preserving a constant velocity for the sprinkler unit so as to obtain an even water level coverage, and the disadvantages of requiring the unit to be attended in order to avoid obstructions on the ground or overhead.

The foregoing disadvantages and shortcomings have been effectively overcome in accordance with the present invention wherein an extremely large diameter hose is employed which will give very high capacity water coverage which may be varied from 100 to 550 gallons per minute at a pressure of from about 75 to 85 pounds per square inch. Thus a four inch ID rubberized nylon hose is used having a length in the order of 660 feet. When in use and under pressure, this hose is capable of being extended to about 4.4" ID and up to 685' in length. The introduction of a hose of this size merely introduces further problems of handling which are effectively solved by the present invention.

In the practice of the present invention, a field or area to be irrigated is laid off in a rectangular pattern with the sprinkler unit positioned in one corner thereof directed by means of a cable toward an adjacent corner at which one end of the cable is securely anchored. The free end of the cable is entrained around a motor driven winch mounted on the sprinkler unit itself. Water is brought to the unit from a separate pump unit with the aid of conventional pipe and then by means of the aforementioned large diameter hose which is swivel coupled to the rear of the sprinkler unit. Means are provided for sensing the buildup in diameter of the cable on the winch for controlling the speed of the motor so that the vehicle is driven at a substantially constant velocity toward the anchored end of the cable.

As an added labor saving feature, a clutching means operative to transmit the output of the motor to the winch is made automatic by being provided with means to engage the clutch when water from the pump unit arrives at the portable vehicle itself. After the automatic clutching means has been engaged, the portable sprinkler unit is pulled by means of the cable toward the fixed end thereof. Finally, as an additional feature, the portable sprinkler vehicle is provided with means actuated near the end of the run to shut off the motor drive. A specific embodiment for accomplishing this in the present invention is an obstruction affixed to the cable which actuates a sensor means positioned ahead of guide rollers for the cable on the vehicle itself.

The inherent advantages and improvements of the present invention will become more readily apparent upon considering the following detailed description of the invention and by reference to the drawings in which:

FIG. 1 is a side elevational view of the mobile sprinkler unit of the present invention;

FIG. 2 is a schematic plan view illustrating a typical sprinkler pattern for an 80 acre layout;

FIG. 3 is a side elevational view of the mobile sprinkler unit of FIG. 1 with parts removed and broken away;

FIG. 4 is a vertical cross-sectional view illustrating an automatic clutching means taken along line 4—4 of FIG. 3;

FIG. 5 is a fragmentary perspective view, drawn to an enlarged scale, illustrating a clutch detent means;

FIG. 6 is a vertical cross-sectional view taken along line 6—6 of FIG. 4;

Figure 7:
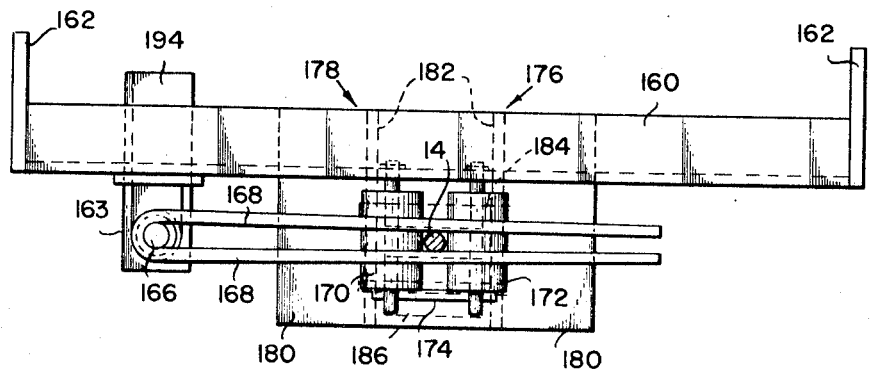
FIG. 7 is a front elevational view illustrating a cable guiding means for the mobile sprinkler unit of FIG. 1.

While the various features of this invention are hereinafter illustrated and described as being especially useful when provided with specific embodiments of automatic clutching means and automatic shut-off means, it is to be understood that the various features of this invention can be utilized singly or in various combinations thereof as well as in combination with equivalent automatic clutching and shut-off means.

Therefore, this invention is not to be limited merely to the embodiments illustrated in the drawings because the drawings are utilized merely to illustrate one of a wide variety of uses of this invention.

Referring now specifically to FIG. 1 of the drawings, there is illustrated a portable vehicle indicated generally at 10 provided with pneumatic tires 12. A cable used to direct and guide the vehicle is shown at 14 attached to an anchor 16 which constitutes the end of the run for the portable vehicle 10.

A winch or reel 18 is mounted on the frame 20 of the vehicle 10 and is journaled at 22. A suitable motor 24 encased within housing 25 is used to propel vehicle 10 and is provided with fuel from a pair of symmetrically mounted LP gas tanks, one of which is shown at 26. Each gas tank 26 has a base support 28 and U-shaped upper side supports 30. Means which form no part of this invention are provided to switch automatically from one LP gas tank to the other when the first gas tank becomes exhausted.

A sprinkler gun is indicated generally at 32 and once again for purposes of this invention may constitute any gun capable of handling a water capacity of from 100 to 550 gallons per minute. Sprinkler gun 32 is attached to vehicle 10 by means of a swivel mounting at 34 to which are attached brace supports 36 and 38. The sprinkler gun on the portable unit is fully adjustable. It distributes evenly from 100 to 550 gallons per minute in any part of a circle pattern that is desired. This invention will be described with respect to a 300 degree pattern with the understanding that any arc may be selected as desired. Not only may the part of the circle pattern be varied but also the height of the sprinkle gun may be varied to clear known overhead obstructions. A 4" ID hose 40 is attached by means of coupling member 42 to the swivel mounting 34.

Referring now to FIG. 2, there is illustrated a typical layout for an 80 acre rectangular field. The vehicle 10 in FIG. 2 is shown in a position in which it has completed its first run and is in the process of completing its second run. In order to complete the first run water was brought through conventional piping 44, 46 to hose 40 from a central pumping station 48, identified as P. After the first run was completed the pipe 46 was disconnected so that on the second run the water from pumping station 48 is brought to the vehicle through piping 44 and hose 40. Capstans 54, as illustrated in solid lines in FIG. 2, are positioned in spaced relation to the side of anchor 16 to facilitate guiding the hose 40 as it follows vehicle 10 enroute to the starting point for the second strip area to be watered.

It will be observed that the field to be irrigated has been divided into individual irrigation areas 50 separated by imaginary lines 52. The patterned watered area is designated 56 from the sprinkler gun 32 mounted on vehicle 10. The cable 14 is laid out along lines 52 whereby the area to be watered constitutes one-half of each of the irrigation areas 50 on either side of imaginary lines 52.

In actual practice, one suitable sprinkler gun 32 cast the water at a 165 foot radius whereby the watered area 56 is 330 feet in diameter. To accommodate this pattern there is 330 feet between each of the imaginary lines 52. The position of the anchors 16 to which the cable 14 is connected is illustrated in FIG. 2 with capstans 54 being positioned so as to guide the hose as it is being conveyed from one watered area to another. The second position for the capstans 54 is indicated in phantom in FIG. 2.

As the portable vehicle 10 nears the end of its run, i.e. approaches anchor 16, it is desired to stop the drive to the vehicle. This is accomplished in a preferred form by attaching a suitable obstruction 60, such as a C-clamp, to the cable 14 which serves to stop the vehicle in a manner to be described hereinafter.

Referring now to FIG. 3, there is illustrated a drive means interconnecting the motor 24 with the driven winch 18. Thus there is shown a gear box 62 which receives the output from motor 14 and provides a desired reduction in revolutions per minute. A chain link 64 conveys the output from gear box 62 to a sprocket 66 mounted on shaft 68. A small sprocket 69 on shaft 68 is provided with chain link 70 to interconnect sprocket 69 to sprocket 72 which provides a further speed reduction to its shaft 74. Another sprocket, not shown in FIG. 3, is provided with chain link 76 to provide the drive for the core 80 of winch 18 which rotates about journaled shaft 22. A sensor bar 82 extends transversely of the frame 20 of vehicle 10 and engages the cable 14 in its various positions so as to detect the build-up thereof on core 80 of winch 18. Sensor bar 82 is attached to the end of rod 84 which in turn is pivotally connected beneath frame 20. Plate 86, integral with rod 84, transmits the pivotal motion of rod 84 by means of link 88 to a bell crank 90. The pivotal motion thereof actuates a link 92 connected to a governor for motor 24.

Referring now to FIGS. 4 and 5, there is illustrated an automatic clutching mechanism to transmit the output of motor 14 to winch 18. Thus there is illustrated a locking or detent mechanism indicated generally at 100 located at one end of shaft 68 and a clutch mechanism indicated generally at 110 located on the opposite end of shaft 68.

There is shown at 112 an actuating rod the end of which is provided with a handle 114. Actuating rod 112 extends through a slot 116 in an angle member 118 secured to frame 20 by any suitable means, such as by welding. Actuating rod 112 is further provided with a depending locking detent 120. The actuating rod 112 is shown in its locked position in FIG. 4 and in the solid line representation in FIG. 5. The actuating rod 112 is shown in its unlocked position, namely, the position in which the clutch is engaged, in the phantom line representation in FIG. 5. In order to permit the actuating rod 112 to move from its solid line position to its phantom line position in FIG. 5, there is provided beneath it a water actuated water cylinder indicated generally at 122. Water cylinder 122 is provided with a hollow fixed lower chamber 124 to which is provided a water inlet 126. Water cylinder 122 further has a movable upper member 128 which carries a U-shaped contact arm 130.

The purpose of the contact arm 130 is to engage the undersurface of actuating rod 112 thereby freeing the locking detent 120 from engagement with angle 118 beneath slot 116 whereby actuating rod 112 may be pulled to the right as shown in FIGS. 4 and 5 by means of a spring 150 thereby permitting a clutch mechanism to become engaged.

This clutch mechanism consists of a jaw clutch 132 mounted on the inside of sprocket 66 which is engaged by another jaw clutch 134 which is keyed at 136 at shaft 68. Jaw clutch 134 is provided with a circumferential slot 138 to permit movement of jaw clutch 134 axially along shaft 68. Cooperating structure to effect reciprocation of jaw clutch 134 includes a cantilevered rod 140 on which is pivotally mounted a yoke element indicated generally at 142 in FIG. 6. Yoke element 142 pivots about pivot 144 so as to permit yoke arms 146 to position studs 148 within the circumferential slot 138 of jaw clutch 134 whereby upon pivotal movement imparted to the yoke element 142 the jaw clutch 134 will slide axially along shaft 68 guided by key element 136. A spacer member 152 shown in FIG. 4 prevents the jaw clutch elements 134 and 132 from becoming engaged accidentally. The spacer element 152 is collapsible under the influence of spring 150 whenever the locking detent 120 is raised by U-shaped contact arm 130 so as to permit movement of actuating rod 112 to the right in FIGS. 4 and 5. It will be observed that actuating rod 112 extends through a rear wall of the uppermost yoke element 146. Handle 114 permits the clutch 110 to be manually disengaged by placing the actuating rod 112 into its locked position.

Figure 8:
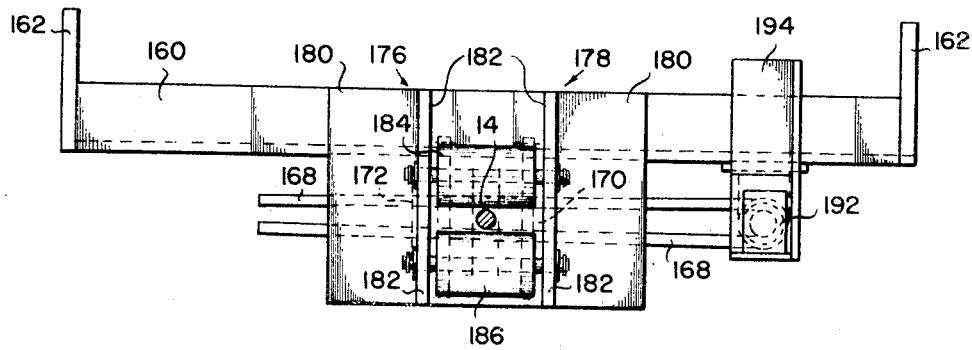
FIG. 8 is a rear elevational view of the cable guiding means of FIG. 7.
Figure 9:
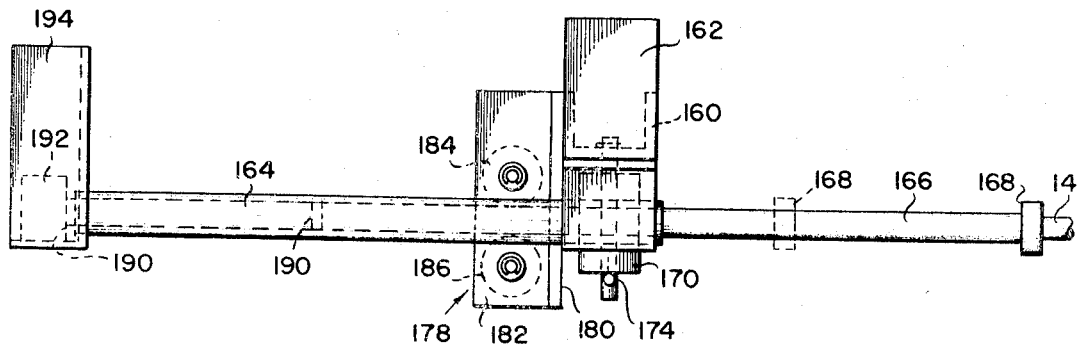
FIG. 9 is a side elevational view of the cable guiding means of FIG. 7.

Referring now to FIGS. 7 through 9, there is illustrated means for automatically stopping the mobile vehicle as it approaches the end of its irrigating run. In FIG. 7 is illustrated a channel member 160 which is provided with flanged ends at 162. Channel member 160 is bolted or welded to the underside of transverse flat frame member which is at right angles to frame member 20. Attached to the underside of channel member 160 by means of a suitable coupling member 163 is a hollow tube 164. Tube 164 provides a conduit for a rod member 166 which reciprocates therein in a manner to be described hereinafter so as to actuate an electric switch and shut off the motor drive.

Rod member 166 is provided with a pair of fingers 168 at its leading extremity which extends transversely in front of a pair of vertically mounted guide rollers 170 and 172. A rod 174 provides a lower support for vertical guide rollers 170, 172, the other axle of which is received within the base of channel 160. Mounted to the rear of vretical guide rollers 170 and 172 by means of angle members 176 and 178 indicated generally are a pair of horizontal guide rollers 184 and 186. Reference to FIG. 8 illustrates that each angle member 176 and 178 is provided with a vertically extending leg 180 and a rearwardly extending leg 182. The horizontally extending guide rollers 184 and 186 are supported in the rearwardly extending second legs of angle members 176 and 178, respectively. In this manner the cable 14 is supported so that it is controlled to prevent excess horizontal motion by means of guide rollers 170 and 172 and confined in a vertical direction by means of upper and lower horizontal guide rollers 184 and 186. A pair of fingers 168 extend transversely in front of guide rollers 170 and 172 so that a particular segment of cable 14 passes through fingers 168 prior to its being wound upon the core 80 of winch 18.

In order to provide an automatic stop for the motor driven winch 18, a suitable obstruction 60 such as a C-clamp is affixed to the cable 14 at a desired position relatively closely adjacent anchor 16. The obstruction 60 is made of such a size so that it will not pass through the fingers 168 which extend from the end of rod member 166. Therefore, when the obstruction 60 contacts fingers 168, rod 166 moves axially rearwardly within hollow tube 164 until such time as the end 190 of rod 166 contacts an electric switch 192 on angle member 194 thereby stopping electric motor 24.

It is preferred to use a 5/16 inch cable in that it has been found that this size cable will withstand the 8,000 pound pull necessary to pull the portable sprinkler vehicle which weighs on the order of 2,100 pounds. It has been found for example, that a 3/8 inch cable will not permit a proper amount of cable to build up on the core 80 of winch 18 so as to obtain a satisfactory amount of speed variation for the electrically driven motor 24 in the course of traversing a single run. It has further been found that the smaller diameter cable will not be strong enough to withstand the 8,000 pound of pull required to drive the portable vehicle.

The 4-inch diameter rubberized Nylon hose may be purchased from B. F. Goodrich, for example. The use of capstans eliminate the need for reeling and unreeling hose in moving it from one run to another, but it is possible to use a reel in place of these capstans to transport the hose to the next watering location. A 9600 to 1 gear reduction is effected between the motor 24 and winch 18 which in terms of revolutions per minute effects a reduction from 2400 r.p.m. to ¼ r.p.m.

It has been found that the motor driven winch propelled sprinkler unit is not deterred by field obstructions frequently encountered on the ground or overhead. It is possible to apply 2½ inches of water to ten acres unattended during a 24 hour period with the water irrigation system of the present invention.

While presently preferred embodiments of the invention have been illustrated and described, it will be recognized that the invention may be otherwise variously embodied and practiced.

What we claim is:
1. In a water irrigation system, the combination of
 (a) a cable,
 (b) means for anchoring one end of said cable,
 (c) a portable vehicle attached to the unanchored end of said cable,
 (d) a winch mounted for rotation on said vehicle for winding said cable,
 (e) a motor mounted on said vehicle to drive said winch and thereby propel said vehicle toward the anchored end of said cable,
  (1) fuel means mounted on said carriage to supply fuel to said motor,
 (f) a sprinkler head mounted on said vehicle,
 (g) hose means interconnecting said sprinkler head with a source of water,
 (h) means for controlling the speed of said motor including means for sensing the build-up in diameter of said cable on said winch,
 (i) whereby said vehicle is driven at a substantially constant speed toward the anchored end of said cable.

2. In a water irrigation system, the combination of
 (a) cable,
 (b) means for anchoring one end of said cable,
 (c) a portable vehicle attached to the unanchored end of said cable,
 (d) a winch mounted for rotation on said vehicle for winding said cable,
 (e) a motor mounted on said vehicle to drive said winch and thereby propel said vehicle toward the anchored end of said cable,
 (f) a sprinkler head mounted on said vehicle,
 (g) hose means interconnecting said sprinkler head with a source of water,
 (h) clutch means operative to transmit the output of said motor to said winch,
 (i) means to actuate said clutch means automatically when water from said source of water reaches said portable vehicle,
 (j) and means for sensing the build-up in diameter of said cable on said winch for controlling the speed of said motor,
 (k) whereby said vehicle is driven at a substantially constant speed toward the anchored end of said cable.

3. A water irrigation system as defined in claim 2 wherein said motor is provided with a governor and said means for sensing the build-up in diameter of said cable on said winch comprises a lever mounted to the frame of said vehicle engageable with said cable as it is being wound onto said winch.

4. A water irrigation system as defined in claim 2 including link means movable by said lever and connected to said governor.

5. A water irrigation system as defined in claim 2 including means to stop said vehicle automatically when it closely approaches the anchored end of said cable.

6. A water irrigation system as defined in claim 2 wherein said means to actuate said clutch means automatically includes spring means normally biasing said clutch means into operative position; detent means for holding said clutch means inoperative, and means for freeing said detent means.

7. A water irrigation system as defined in claim 6 wherein said means for freeing said detent means is a water cylinder actuated when water from said source of water reaches said portable vehicle.

8. A water irrigation system as defined in claim 2 including means to stop said vehicle automatically when it closely approaches the anchored end of said cable.

9. A water irrigation system as defined in claim 5 including longitudinally spaced roller gluide means for controlling the lead in of said cable to said winch both vertically and horizontally.

10. A water irrigation system as defined in claim 2 wherein said means to stop said vehicle automatically includes an obstruction affixed to said cable means and sensor means actuated by the presence of said obstruction affixed to said cable to stop said vehicle and wherein said means to stop said vehicle includes an electric switch actuated by said sensor means.

11. A water irrigation system as defined in claim 10 wherein said sensor means comprises a hollow tube fixedly mounted to said vehicle and a rod slidable axially within said tube, said rod having a pair of fingers at one end thereof spaced apart a predetermined distance to permit said cable to pass freely therethrough but not permitting said obstruction to pass therethrough whereby said obstruction causes axial movement of said rod until the other end thereof contacts said electrical switch.

12. A water irrigation system as defined in claim 8 including roller guide means for controlling the lead in of said cable to said winch both vertically and horizontally.

13. A water irrigation system as defined in claim 12 wherein said means to stop said vehicle automatically includes an obstruction affixed to said cable means and sensor means actuated by the presence of said obstruction affixed to said cable to stop said vehicle.

14. A water irrigation system as defined in claim 13 wherein said sensor means is positioned ahead of said roller guide means.

15. A water irrigation system as defined in claim 13 wherein said means to stop said vehicle further includes an electric switch actuated by said sensor means.

16. A water irrigation system as defined in claim 15 wherein said sensor means comprises a hollow tube fixedly mounted to said vehicle and a rod slidable axially within said tube, said rod having a pair of fingers at one end thereof spaced apart a predetermined distance to permit cable to pass freely therethrough but not permitting said obstruction to pass therethrough whereby said obstruction causes axial movement of said rod until the other end thereof contacts said electric switch.

References Cited
UNITED STATES PATENTS

| | | | |
|---|---|---|---|
| 693,421 | 2/1902 | Munch | 239—189 |
| 947,344 | 1/1910 | Nicholson. | |
| 2,722,454 | 11/1955 | Jepson | 239—189 |
| 2,958,470 | 11/1960 | Giwosky | 239—189 |

M. HENSON WOOD, Jr., Primary Examiner

M. Y. MAY, Assistant Examiner

U.S. Cl. X.R.

137—344; 242—86.51